Dec. 2, 1941.  A. L. CHAMBERLAIN  2,264,741
CUP PACKING
Filed Jan. 5, 1940
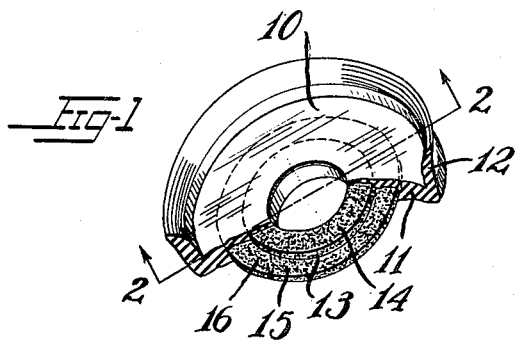
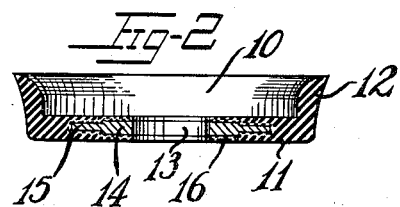
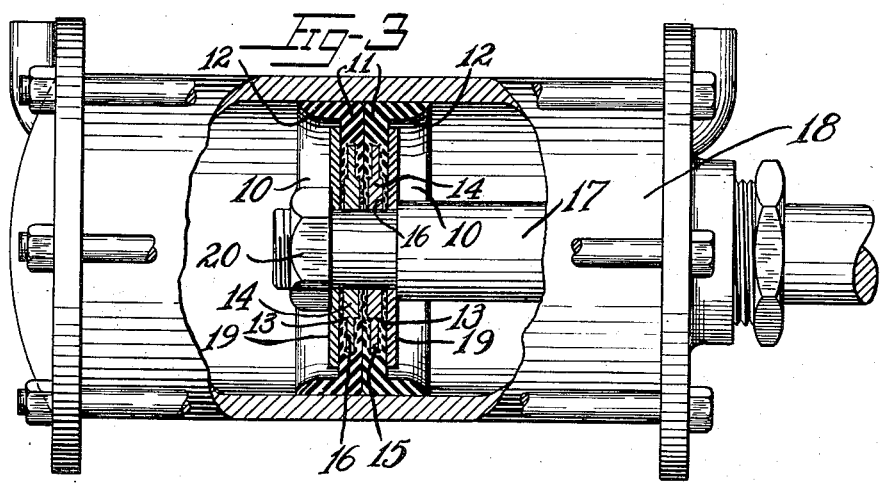
Inventor
Arthur L. Chamberlain
By Willis F. Avery
Atty Patented Dec. 2, 1941

2,264,741

UNITED STATES PATENT OFFICE 2,264,741

CUP PACKING

Arthur L. Chamberlain, Cuyahoga Falls, Ohio, assignor to The B. F. Goodrich Company, New York, N. Y., a corporation of New York Application January 5, 1940, Serial No. 312,511

3 Claims. (Cl. 309—33)

This invention relates to packings, and more particularly to cup packings adapted to engage the walls of a cylinder. Such packings are commonly required on reciprocating plungers in pumps for handling or controlling fluids such as air, water, or oil. The cup packings of this invention find particularly utility in air cylinders in which moisture or oil may be present in the air. Such cup packings have ordinarily been made of leather, but required frequent replacement due to the embrittling of leather when it dried out after becoming wet and the softening of the leather when subjected to air containing oil. The cup packings are ordinarily mounted in pairs and clamped between rigid surfaces on the end of a shaft. This clamping process often caused the lips of the packings to tip and allow leakage of fluid along the cylinder wall.

It is an object of this invention to provide cup packings which will resist the action of oil and water. It is another object of this invention to provide cup packings which may be tightly clamped between rigid clamping means without distortion of the lip of the washer. Further objects will be apparent from the following description of a preferred embodiment of the invention.

In the accompanying drawing, Fig. 1 represents a perspective view of a cup packing partly cut away and in section to show the metallic insert;

Fig. 2 represents a section taken on line 2—2 of Fig. 1, and

Fig. 3 represents an elevation of an air cylinder partly cut away and in section to show a pair of cup washers in use.

Referring to the drawing, a cup packing 10 made in accordance with principles of this invention comprises an annular base 11 with an integral outer lip portion 12. The packing is made of any suitable resilient, water-resistant, oil-resistant, rubber-like material such as vulcanized neoprene, a vulcanized olefin polysulfide, a vulcanized copolymer of butadiene-1,3 and acrylic nitrile, a plasticized polymerized gamma polyvinyl chloride, etc.

The metallic insert 13, which may suitably be made of iron or brass, has an inner peripheral margin 14 of substantially the same thickness as the base 11 and a thinner outer peripheral margin 15. The metallic insert may be of the shape shown, or may be wedge-shaped. The thin outer peripheral margin appears to be necessary for the firm anchorage of the insert in the base, while the wider inner peripheral margin is of substantially the same thickness as the base in order that the gaskets may be clamped as firmly as desired without distortion. The metallic insert may extend nearly to the outer periphery of the base if desired, but this is ordinarily unnecessary since gaskets in which the outer diameter of the insert is materially less than the outer diameter of the base, as when the width of the metallic insert is only one-half or two-thirds the width of the base, have given excellent service.

Excellent adhesion of the metallic insert to the base of the packing is essential if the packings are to render good service for long periods of time. The adhesion is ordinarily accomplished by applying an appropriate cement 16 to the insert prior to association with the base. The nature of the cement will naturally vary with the composition of the packing, but any of the known methods for adhering the resilient materials to metal may be employed. It has been found that in general, chlorinated rubber cements give satisfactory adhesion.

In Fig. 3 showing the use of the cup packings of this invention, two packings 10, 10 are mounted on the end of a shaft 17 inside an air cylinder 18, and the base portions 11, 11 are tightly clamped between washers 19, 19 by tightening the nut 20. The cups can be drawn together tight enough to prevent leakage between the shaft 17 and the bases 11, 11 without any danger of cracking the bases 11, 11 or of distorting the lips 12, 12.

It will be noted that the inner peripheral margin 14 of the metallic insert is slightly thinner than the base 11. The metallic insert may be made as thick as the base at this point if desired, but it is somewhat more difficult to mold such packings and the adhesion of the resilient material to the metal is not quite as satisfactory.

Although I have herein disclosed a specific embodiment of my invention, I do not intend to limit myself solely thereto, for other modifications are within the spirit and scope of the invention as defined in the appended claims.

I claim:

1. A cup packing comprising an annular base with an integral outer lip portion adapted to form a seal with the walls of a cylinder, said packing being made of a resilient, water-resistant, oil-resistant, rubber-like material and having embedded in and adhered to said base an annular metallic insert with an inner diameter equal to the inner diameter of the base portion, the inner peripheral margin of said metallic insert being only slightly thinner than the base portion and thicker than the outer peripheral margin.

2. A cup packing comprising an annular base with an integral outer lip portion adapted to form a seal with the walls of a cylinder, said packing being made of a resilient, water-resistant, oil-resistant, rubber-like material and having embedded in and adhered to said base an annular metallic insert with an inner diameter equal to the inner diameter of the base and an outer diameter materially less than the outer diameter of the base, the inner peripheral margin of said metallic insert being slightly thinner than the base and thicker than the outer peripheral margin.

3. A pair of cup packings, each comprising an annular base with an integral outer lip portion adapted to form a seal with the walls of a cylinder, said packing being made of a resilient, water-resistant, oil-resistant, rubber-like material and having embedded in and adhered to said base an annular metallic insert with an inner diameter equal to the inner diameter of the base portion, the inner peripheral margin of said metallic insert being only slightly thinner than the base portion and thicker than the outer peripheral margin, said packings being tightly clamped between rigid surfaces.

ARTHUR L. CHAMBERLAIN.